United States Patent
Saber et al.

(10) Patent No.: US 11,546,930 B2
(45) Date of Patent: Jan. 3, 2023

(54) SYSTEM AND METHOD FOR SIGNAL/CHANNEL DROPPING DURING HANDOVER FOR USER EQUIPMENT

(71) Applicant: Samsung Electronics Co., Ltd., Gyeonggi-do (KR)

(72) Inventors: Hamid Saber, San Diego, CA (US); Jung Hyun Bae, San Diego, CA (US); Yuan-Sheng Cheng, San Diego, CA (US)

(73) Assignee: Samsung Electronics Co., Ltd

( * ) Notice: Subject to any disclaimer, the term of this patent is extended or adjusted under 35 U.S.C. 154(b) by 98 days.

(21) Appl. No.: 17/012,315

(22) Filed: Sep. 4, 2020

(65) Prior Publication Data

US 2021/0136795 A1 May 6, 2021

Related U.S. Application Data

(60) Provisional application No. 63/056,305, filed on Jul. 24, 2020, provisional application No. 63/025,372, filed on May 15, 2020, provisional application No. 62/977,019, filed on Feb. 14, 2020, provisional application No. 62/931,092, filed on Nov. 5, 2019, (Continued)

(51) Int. Cl.
| | |
|---|---|
| *H04W 72/12* | (2009.01) |
| *H04W 36/00* | (2009.01) |
| *H04L 5/00* | (2006.01) |
| *H04W 74/08* | (2009.01) |
| *H04L 1/16* | (2006.01) |

(52) U.S. Cl.
CPC ....... *H04W 72/1268* (2013.01); *H04L 1/1642* (2013.01); *H04L 5/0094* (2013.01); *H04W 36/0069* (2018.08); *H04W 74/0808* (2013.01)

(58) Field of Classification Search
CPC .... H04W 36/0069; H04W 72/1278–14; H04L 5/0035; H04L 5/0091–0098
See application file for complete search history.

(56) References Cited

U.S. PATENT DOCUMENTS

| | | | |
|---|---|---|---|
| 2018/0176937 A1* | 6/2018 | Chen ................. | H04W 72/0413 |
| 2019/0335488 A1 | 10/2019 | Xiong et al. | |
| 2019/0394822 A1* | 12/2019 | Hosseini ........... | H04W 72/0473 |

(Continued)

FOREIGN PATENT DOCUMENTS

| | | |
|---|---|---|
| CN | 110351041 | 10/2019 |
| CN | 111093270 | 5/2020 |
| WO | WO2020032774 | 2/2020 |

OTHER PUBLICATIONS

Huawei, HiSilicon, "Further Considerations on Non-Simultaneous Reception and Transmission for MTC UEs", R2-156546, 3GPP TSG RAN WG2 Meeting #92, Nov. 15-22, 2015, 4 pages.

(Continued)

*Primary Examiner* — Marcus Smith
(74) *Attorney, Agent, or Firm* — The Farrell Law Firm, P.C.

(57) ABSTRACT

A method and user equipment are provided. The method includes receiving a scheduling of an uplink (UL) signal on a target cell that collides with a UL signal on a source cell, determining a cancellation time for dropping the UL signal on the source cell, and dropping at least a portion of the UL signal on the source cell based on the determined cancellation time.

24 Claims, 8 Drawing Sheets

Related U.S. Application Data provisional application No. 62/929,651, filed on Nov. 1, 2019.

(56) References Cited

U.S. PATENT DOCUMENTS

| | | | |
|---|---|---|---|
| 2020/0322972 A1* | 10/2020 | Hosseini | H04L 27/26025 |
| 2021/0105797 A1* | 4/2021 | Awoniyi-Oteri | H04W 72/1268 |
| 2021/0105803 A1* | 4/2021 | Yang | H04L 5/0091 |

OTHER PUBLICATIONS

Intel Corporation, "Summary of Offline Discussion on Physical Layer Aspects of NR Mobility Enhancement", R1-1911538, 3GPP TSG RAN WG1 Meeting #98bis, Aug. 14-20, 2019, 12pgs.

Vivo, "Summary#4 of UL Inter UE Tx Prioritization/Multiplexing", R1-1911712, 3GPP TSG RAN WG1 #98bis, Oct. 14-20, 2019, 39 pages.

European Search Report dated Jan. 19, 2021 issued in counterpart application No. 20197242.9-1212, 12 pages.

\* cited by examiner

SYSTEM AND METHOD FOR SIGNAL/CHANNEL DROPPING DURING HANDOVER FOR USER EQUIPMENT

PRIORITY

This application is based on and claims priority under 35 U.S.C. § 119(e) to U.S. Provisional Patent Application filed on Nov. 1, 2019 and assigned Ser. No. 62/929,651, U.S. Provisional Patent Application tiled on Nov. 5, 2019 and assigned Ser. No. 62/931,092, U.S. Provisional Patent Application filed on Feb. 14, 2020 and assigned Ser. No. 62/977,019, U.S. Provisional Patent Application filed on May 15, 2020 and assigned Ser. No. 63/025,372, U.S. Provisional Patent Application filed on Jul. 24, 2020 and assigned Ser. No. 63/056,305 the entire contents of which are incorporated herein by reference.

FIELD

The present disclosure is generally related to wireless communication systems. In particular, the present disclosure is related to a system and method for providing uplink signal/channel dropping for dual active protocol stack (DAPS) handover to support non-simultaneous transmission.

BACKGROUND

In traditional handover, a user equipment (UE) gets disconnected from the source cell when it starts attempting handover procedure to the target cell, which creates data interruption until a UE finishes the handover. To improve interruption during such handover procedure, it is possible that the UE is connected to both cells during the handover, which can be referred to as a DAPS handover, and dynamically scheduled or semi-statically configured to transmit on both cells. When the uplink (UL) signal/channel on the source cell overlaps/collides with UL signal/channel on the target cell, the UE may need to drop the source cell signal/channel. From the UE implementation perspective, to perform the dropping, the UE should be provided with sufficient amount of time, but no such implementation is provided in the current cellular system to ensure proper UE operation.

SUMMARY

According to one embodiment, a method includes receiving a scheduling of an UL signal on a target cell that collides with a UL signal on a source cell, determining a cancellation time for dropping the UL signal on the source cell, and dropping at least a portion of the UL signal on the source cell based on the determined cancellation time.

According to one embodiment, a UE includes a transceiver and a processor configured to receive, by the transceiver, a scheduling of an uplink (UL) signal on a target cell that collides with a UL signal on a source cell, determine a cancellation time for dropping the UL signal on the source cell and drop at least a portion of the UL signal on the source cell based on the determined cancellation time.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
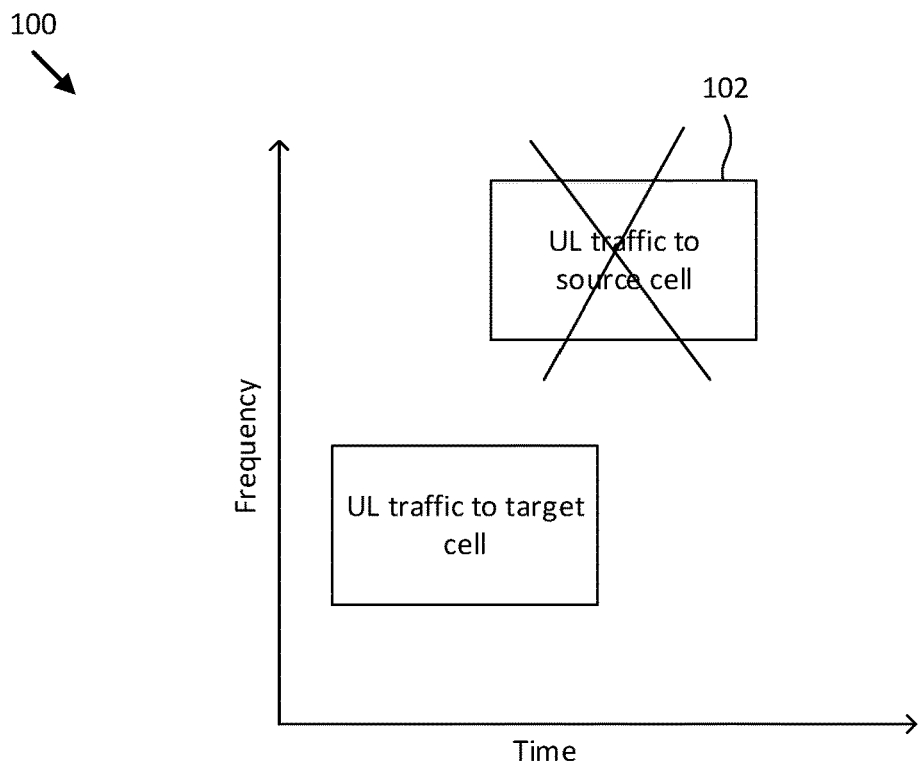
FIG. 1 illustrates a diagram of overlapping/colliding conditions during a DAPS handover, according to an embodiment.
Figure 1:
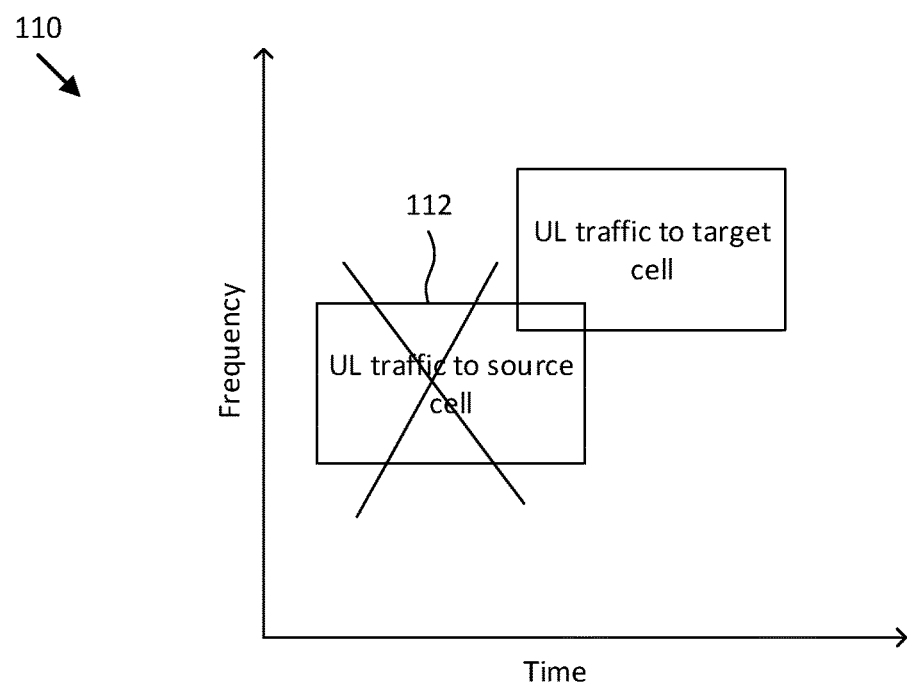

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise, In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may he a single integral component, or a minimum unit or part thereof, adapted to perform one or more functions. For example, according to one embodiment, a module may be implemented in a form of an application-specific integrated circuit (ASIC).

During DAPS handover, it is assumed network may not able to always schedule transmissions associated with source and target cell for the same UE in a time-division multiplexing (TDM) manner. The UE may need to handle the situation when the transmissions between the source and target cell are overlapping in time or overlapping in time and frequency. For the downlink (DL) traffic, it is assumed that UEs supporting DAPS handovers have the capability to receive DL traffic from a source and target cell simultaneously, regardless the overlapping conditions of the transmissions. For UL traffic, the signal/channel to the target cell is prioritized, the UE will need to drop the source cell signal/channel when both of the following conditions are met: (1) when the UE does not support simultaneous transmission or the UE is operated in an intra-frequency DAPS handover, and (2) the UL signal/channel to the source cell and the UL signal/channel to the target cell overlaps in time. The network has the right to configure the UE with a no power sharing mode regardless of the UE's simultaneous transmission capability and the first condition above is considered fulfilled when this happens.

FIG. 1 illustrates a diagram of overlapping/colliding conditions during a DAPS handover, according to an embodiment. Scenario 100 occurs when the UE does not support simultaneous transmission or the UE is operated during intra frequency DAPS handovers and the UL/channel is overlapping in time. The UL traffic to the source cell 102 is dropped. Scenario 110 occurs when the UL signal/channel is overlapping in time and frequency. The UL traffic to the source cell 112 is dropped.

Figure 2:
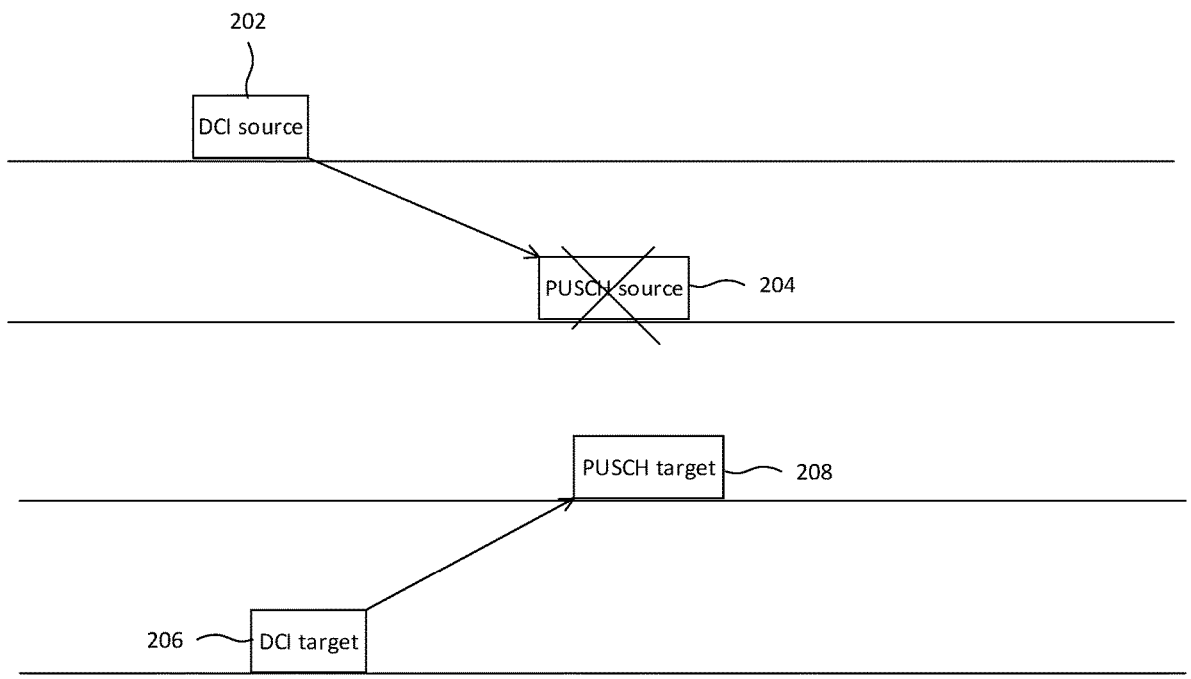
FIG. 2 illustrates a diagram of a physical uplink shared channel (PUSCH) scheduled on the source cell overlapping with a PUSCH scheduled on the target cell, according to an embodiment.

FIG. 2 illustrates a diagram of a PUSCH scheduled on the source cell overlapping with a PUSCH scheduled on the target cell, according to an embodiment. From the UE implementation perspective, to perform the dropping, the UE should be provided with a sufficient amount of time after being aware of the overlapping condition. FIG. 2 shows a typical scenario where the PUSCH 204 scheduled by downlink control information (DCI) 202 on the source cell overlaps/collides with the PUSCH 208 scheduled by DCI 206 on the target channel. In such a case, if the UE is provided with sufficient time, the UE will cancel/drop the transmission of the PUSCH 204 on the source cell.

When a UE which is connected to both a target and a source cell at the same time, there may be only one transmission in each of the target and source cell. Described below is the timeline for dropping the signal/channel on the source cell based on $N_2$ (as well as $T_{proc,2}$ which is derived by $N_2$ as described in 6.4 of TS 38.214) and $N_1$ (as well as $T_{proc,1}$ which is derived by $N_1$ as described in 5.3 of TS 38.214) for the PUSCH and the physical downlink shared channel (PDSCH) processing capability. Table 1 and Table 2 from TS 38.214 provide the values of these two capabilities.

TABLE 1

| $\mu$ | PUSCH preparation time $N_2$ [symbols] |
|---|---|
| Table 6.4-1: PUSCH preparation time for PUSCH timing capability 1 | |
| 0 | 10 |
| 1 | 12 |
| 2 | 23 |
| 3 | 36 |
| Table 6.4-2: PUSCH preparation time for PUSCH timing capability 2 | |
| 0 | 5 |
| 1 | 5.5 |
| 2 | 11 for frequency range 1 |

TABLE 2

Table 5.3-1; PDSCH processing time for PDSCH processing capability 1

| | PDSCH decoding time $N_1$ [symbols] | |
|---|---|---|
| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

Table 5.3-2; PDSCH processing time for PDSCH processing capability 2

| $\mu$ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

There may be originally multiple overlapping transmissions in each of target and/or source cell. In this case, overlapping transmissions in each cell are first multiplexed according to 9.2.5 of TS 38.213. The minimum time line for such multiplexing of transmissions are given as $T_{proc,2}^{mux}=\max\ (N_2+d_{2,1}+1)\cdot(2048+144)\cdot\kappa\cdot 2^{-\mu}\cdot T_C,\ d_{2,2})$, where the meaning of $N_2$, $d_{2,1}$, $\kappa$, $2^{-\mu}$, $T_C$, $d_{2,2}$ are described in TS38.213 and TS38.214.

To define the timeline for source signal/channel dropping during a handover, the general procedure for cancellation requires the UE to be "aware" of the conditions that lead to cancellation behavior a certain time before the cancellation happens. If the channel/signal to the target cell is semi-persistent or persistent, the UE will be aware of the cancellation conditions once it knows the potential source cell signal/channel. In such a case, there is no timeline issue for cancellation of the source cell. On the other hand, for the dynamic scheduled transmission to the target cell, a cancellation timeline is required and it may be separated into the following cases depending on how the channel/signal to the target cell is scheduled: (1) the channel/signal to the target cell is scheduled by the DCI; and (2) the channel/signal to the target cell is a physical random access channel (PRAM) (msg1 or msg3). There are two additional cancellation mechanisms. In full cancellation, the UE either cancels/drops the whole signal/channel to the source cell entirely if the timeline is met or does not cancel at all. In partial cancellation, the UE cancels/drops the signal/channel partially in a symbol by symbol basis. The UE only requires cancellation of the portion of symbols satisfying the cancellation timeline.

Figure 3:
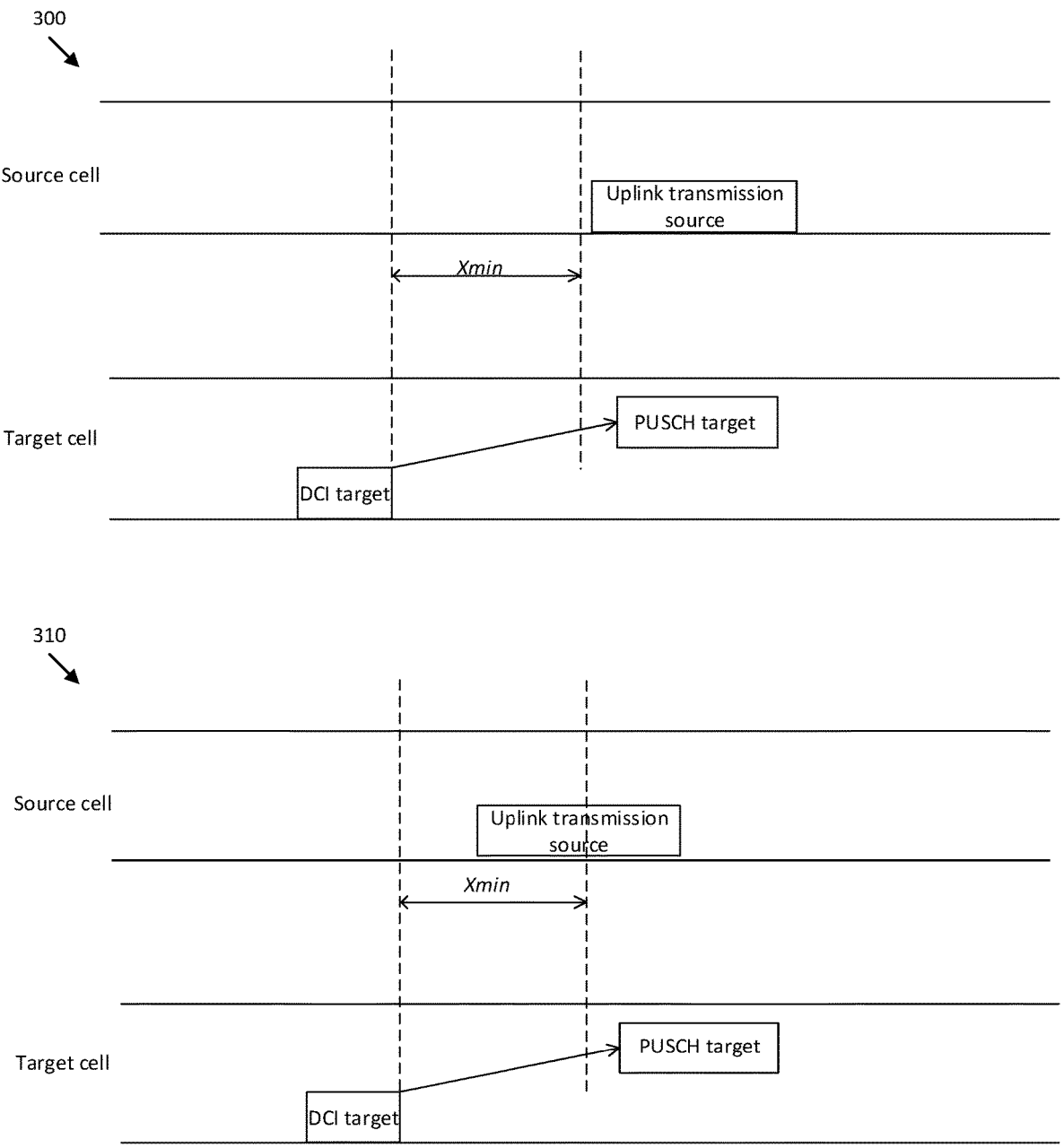
FIG. 3 illustrates a diagram of full cancellation, according to an embodiment.

FIG. 3 illustrates a diagram of full cancellation, according to an embodiment. In full cancellation, in a typical dropping scenario, once the UE has finished the decoding of the scheduling DCI on the target cell, which has scheduled a UL transmission on the target cell, if the scheduled UL signal/channel overlaps/collides with a UL signal/channel on the source cell, the UE will drop the UL signal/channel on the source cell. The amount of time the UE needs for dropping is the time required for the physical downlink control channel (PDCCH) decoding on the target cell and the time required to prepare to drop the UL signal/channel on the source cell. The cancellation time is defined as predetermined amount of time $X_{min}$ after the DCI schedules the target cell transmission. In operation 300, if the overlapping source cell transmission was scheduled to start after this time instant, the UE performs the cancellation. Otherwise, in operation 310, the UE does not cancel the transmission to source cell.

In some embodiments, the system performs full dropping with dependence on two numerologies. Since the UE cancellation procedure in this case involves the decoding of a target cell DCI and the actual cancellation time on transmission to source cell, $X_{min}$ can be determined based on $N_2$ as described below. In one embodiment, the minimum time duration $X_{min}$ from the ending symbol of the PDCCH scheduling the UL transmission on the target cell to starting symbol of a dropped UL signal/channel in the source cell, is based on $N_2$ as a function of the numerology of the scheduling PDCCH on the target cell, $\mu_{DCI,target}$, and the numerology of UL channel/signal on the source cell, $\mu_{ul,source}$ ($\mu_{ul,source}=0$ if the UE transmits PRACH using 1.25 kHz or 5 kHz subcarrier spacing (SCS) on the source cell). It is possible that source cell and target cell have different processing capability. In this case, an $N_2$ can be selected that corresponds to the minimum capability between the source and the target cell, or processing capability of the source cell. The minimum capability may refer to the processing capability with the least requirement among the selections. For example, if the source and target cell are configured with different processing capability, the processing capability is chosen.

When collision of the UL signal/channel on the target cell and the UL signal/channel on the source cell occurs, if the first symbol of the UL transmission in the source cell, including the effect of the timing advance, is no earlier than symbol L, where L is defined as the UL symbol with its cyclic prefix (CP) starting at $X_{min}=(N_2+d_{2,1})(2048+144)\cdot\kappa 2^{-\mu}19\ T_C$ (or $T_{proc,2}$) after the end of the reception of the last symbol of the PDCCH scheduling the UL transmission/ signal on the target cell, then the UE may cancel the transmission of the signal/channel in the source cell. $N_2$ is based on Table 1 and $\mu$ corresponds to the one of ($\mu_{ul,source}$, $\mu_{dci,target}$) resulting in the largest $X_{min}$. Alternatively, $N_2$ may be based on Table 1 and $\mu$ may correspond to the smallest SCS configuration to one of ($\mu_{ul,source}$, $\mu_{dci,target}$). It is possible that the source cell and target cell have a different $N_2$ based on different processing capabilities. In this case, $N_2$ corresponds to the minimum capability between the source and target cell or to the processing capability of source cell. $d1_{2,1}$ is defined according to the demodulation reference signal (DMRS) configuration as described in sub-clause 6.4 of TS 38.214. The choice of $d_{2,1}$ can also be fixed value 1 for relaxing the $X_{min}$ to provide a good upper bound for the required cancellation time of different type of uplink transmissions.

$$\kappa = 64, T_c = \frac{1}{480 \times 10^3 \times 4096}.$$

Otherwise, the UE may ignore the dropping of the signal/channel on the source cell.

When, originally, there are multiple transmissions in the source and/or target cells, to acknowledge the processing time of multiplexing, the above $X_{min}$ can be replaced by the maximum of $T_{proc,2}^{mux}$, $T_{proc,release}^{mux}$ and $T_{proc,CSI}^{mux}$ based on the configuration where $\mu_{ul,source}$ is replaced by the smallest SCS configuration of all originally overlapping source cell transmissions, and $\mu_{dci,target}$ is replaced by the smallest of SCS configuration of PDCCHs for all originally overlapping target cell transmissions.

When the channel state information (CSI) reports involve the collision of the source and target cell, to acknowledge the CSI computation, $X_{min}$ can be replaced by $T_{proc,CSI}$, where $\mu_{ul,source}$ is replaced by the $\mu$ used for calculating the CSI computation time for the source cells, and $\mu_{dci,target}$ is replaced by the p. used for calculating the CSI computation time for the target cells.

When multiplexing is considered, in some UE implementations, it is also reasonable to consider an extra amount of time on top of $X_{min}$ since a UE now needs to perform two separate operations of resolving multiplexing and processing dropping. In that case, either multiplicative scaling (e.g., $\alpha$ as $\alpha X_{min}$) or additive offset (e.g., $\beta$ as $X_{min}+\beta$) to $X_{min}$ may be implemented. In this case, the scaling or offset also needs to be determined by SCS configurations and processing capabilities of the source and target cell. It is also possible not to include SCS configurations of source cell in the determination of $X_{min}$ since it can be absorbed into scaling and/or offset.

As described above, $\mu$ and the processing capability are selected separately in the procedure of determining $N_2$. Since the processing capability is configured per cell, the system may determine the both $N_2$ for the source and target cell by corresponding $\mu$ and processing capability and then select the larger one of the resulting values.

In one embodiment, the minimum time duration $X_{min}$ from the ending symbol of the PDCCH scheduling the UL transmission on the target cell to the starting symbol of a dropped UL signal/channel in the source cell is dependent on $N_{2,source}$ and $N_{2,target}$. $N_{2,source}$ is a function of the numerology of the UL channel/signal on the source cell, $\mu_{ul,source}$ and the processing capability of the source cell. $N_{2,target}$ is a function of the numerology of the scheduling PDCCH on the target cell, $\mu_{DCI,target}$ and the processing capability of the target cell.

In one embodiment, when collision of the UL signal/channel on the target cell and the UL signal/channel on the source cell occurs, if the first symbol of the UL transmission in the source cell, including the effect of the timing advance, is no earlier than symbol L, where L is defined as the UL symbol with its CP starting at $X_{min}=\max\{T_{proc,2,source}, T_{proc,2,target}\}$ after the end of the reception of the last symbol of PDCCH scheduling the UL transmission/signal on the target cell, then the UE may cancel the transmission of the signal/channel in the source cell. $T_{proc,2,source}=(N_{2,source}+d_{2,1})(2048+144) \cdot \kappa 2^{-\mu} \cdot T_C$ and $T_{proc,2,target}=(N_{2,target}+d_{2,1})(2048+144) \cdot \kappa 2^{-\mu} \cdot T_c$. $N_{2,source}$ is based on Table 1, where $\mu$ corresponds to $\mu_{ul,source}$ and the processing capability corresponds to those with the source cell. $N_{2,target}$ is based on Table 1, where $\mu$ corresponds to $\mu_{dci,target}$ and the processing capability corresponds to those with the target cell. $d_{2,1}$ is defined according to the DMRS configuration as described in sub-clause 6.4 of TS 38.214 and $$\kappa = 64, T_c = \frac{1}{480 \times 10^3 \times 4096}.$$

The choice of $d_{2,1}$ can also be fixed value 1 for relaxing the $X_{min}$ to provide a good upper bound for the required cancellation time of different type of uplink transmissions. Otherwise, the UE may ignore the dropping of the signal/channel on the source cell.

Figure 4:
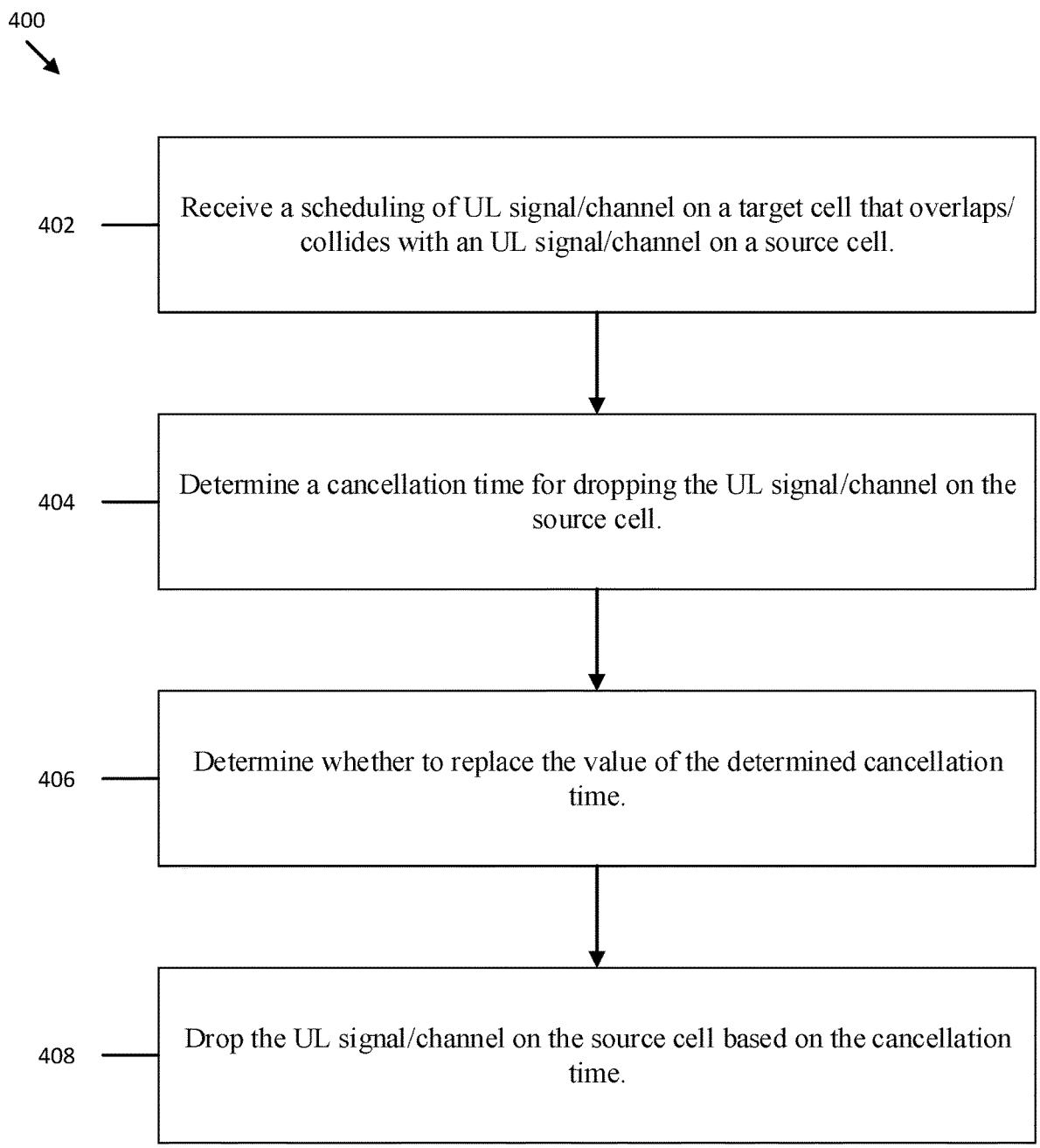
FIG. 4 illustrates a flowchart for a method of UL cancellation, according to an embodiment.

FIG. 4 illustrates a flowchart 400 for a method of UL cancellation, according to an embodiment. At 402, the UE receives a scheduling of an UL signal/channel on a target cell that overlaps/collides with an UL signal/channel on a source cell.

At 404, the UE determines a cancellation time for dropping the UL signal/channel on the source cell. The cancellation time may be determined as $X_{min}=(N_2+d_{2,1})(2048+144) \cdot \kappa 2^{-\mu} \cdot T_c$ (or $T_{proc,2}$), where $N_2$ is based on Table 1 and $\mu$ corresponds to the one of ($\mu_{ul,source}$, $\mu_{dci,target}$) resulting in the largest $X_{min}$. Alternatively, $N_2$ may be based on Table 1 and $\mu$ may correspond to the smallest SCS configuration to one of ($\mu_{ul,source}$, $\mu_{dci,target}$). $\mu_{ul,source}=0$ if the UE transmits the PRACH using 1.25 kHz or 5 kHz SCS on the source cell. is possible that the source cell and target cell have a different processing capability. In this case, $N_2$ corresponds to the minimum capability between the source and target cell, or to the processing capability of source cell. $d_{2,1}$ is defined according to the DMRS configuration as described in sub-clause 6.4 of TS 38.214. The choice of $d_{2,1}$ can also be fixed value 1 for relaxing the $X_{min}$ to provide a good upper bound for the required cancellation time of different type of uplink transmissions.

$$\kappa = 64, T_c = \frac{1}{480 \times 10^3 \times 4096}.$$

At 406, the UE determines whether to replace the value of the determined cancellation time. The value of $X_{min}$ may be replaced by $T_{proc,2}^{mux}$, $T_{proc,release}^{mux}$ or $T_{proc,CSI}$. The value of $X_{min}$ can be replaced by $X_{min}+\beta$ or $\alpha X_{min}$.

At 408, the UE drops UL signal/channel on the source cell based on the cancellation time.

The UE may also determine a time gap. The time gap may be a duration between the UL signal/channel on the source cell and a PDCCH scheduling the UL signal/channel on the target cell. The time gap may be determined to be a duration between the last symbol of the PDCCH scheduling the UL signal/channel on the target cell and the first symbol of the UL signal/channel on the source cell. The UE may drop the UL signal/channel on the source cell if the time gap is greater than the cancellation time. If the time gap is less than the cancellation time, the UE may decide to not drop the UL signal/channel on the source cell. Alternatively, if the time gap is less than the cancellation time, the UE may proceed to partial cancellation processes.

In some embodiments, the system performs full dropping with dependence on four numerologies. In some UE implementations, the decoding time of the PDCCH of the source cell may still need to be considered. Also, the preparation time for the target cell can also affect the UE's decision on source cell transmission dropping. The minimum time duration (i.e., cancellation time) $X_{min}$ from the ending symbol of the PDCCH scheduling the UL transmission on the target cell to starting symbol of a dropped UL signal/channel in the source cell, may be based on $N_2$ as a function of the numerology of the scheduling PDCCH on the target cell, $\mu_{DCI,target}$, the numerology of UL channel/signal on the source cell, $\mu_{ul,source}$ ($\mu_{ul,source}=0$ if the UE transmits PRACH using 1.25 kHz or 5 kHz SCS on the source cell), and the numerology of the scheduling PDCCH on source cell, $\mu_{dci,source}$ (if any). It may also depend on the numerology of the UL channel/signal on the target cell, $\mu_{ul,target}$. The source cell and target cell may have a different processing capability. In this case, $N_2$ corresponds to the minimum capability between source and target cell, or to the processing capability of source cell.

When there is collision of the UL signal/channel on the target cell and the UL signal/channel on the source cell, if the first symbol of the UL transmission in the source cell, including the effect of the timing advance, is no earlier than symbol L, where L is defined as the UL symbol with its CP starting at $X_{min}=(N_2+d_{2,1})(2048+144) \cdot \kappa 2^{-\mu} \cdot T_c$ (or $T_{proc,2}$) after the end of the reception of the last symbol of the PDCCH scheduling the UL transmission/signal on the target cell, then the UE may cancel the transmission of the signal/channel in the source cell. $N_2$ is based on Table 1 and corresponds to the one of ($\mu_{ul,source}$, $\mu_{dci,target}$, $\mu_{ul,target}$, $\mu_{dci,source}$) resulting in the largest $X_{min}$. Alternatively, $N_2$ is based on Table 1. and $\mu$ corresponds to the smallest SCS configuration to one of ($\mu_{ul,source}$, $\mu_{dci,target}$, $\mu_{ul,target}$, $\mu_{dci,source}$) It is possible that source cell and target cell have a different processing capability. In this case, $N_2$ corresponds to the minimum capability between the source and target cell, or to the processing capability of source cell. $d_{2,1}$ is defined according to the DMRS configuration as described in sub-clause 6.4 of TS 38.214. The choice of $d_{2,1}$ can also be a fixed value 1 for relaxing the $X_{min}$ to provide a good upper bound for the required cancellation time of different type of uplink transmissions.

$$\kappa = 64, T_c = \frac{1}{480 \times 10^3 \times 4096}.$$

Otherwise, the UE may ignore the dropping of the signal/channel on the source cell.

When, originally, there are multiple transmissions in the source and/or target cells, to acknowledge the processing time of multiplexing, the above $X_{min}$ can be replaced by the maximum of $T_{proc,2}^{mux}$, $T_{proc,release}^{mux}$, and the $T_{proc,CSI}^{mux}$ based on the configuration where $\mu_{ul,source}$ is replaced by SCS configurations of all originally overlapping source cell transmissions, and $\mu_{dci,target}$ is replaced by SCS configurations of the PDCCHs for all originally overlapping target cell transmissions. $\mu_{ul,target}$ is replaced by SCS configurations of all originally overlapping target cell transmissions, and $\mu_{dci,source}$ is replaced by SCS configurations of PDCCHs for all originally overlapping source cell transmissions.

When the CSI reports involve the collision of the source and target cell, to acknowledge the CSI computation, the above $X_{min}$ can be replaced by $T_{proc,CSI}$, where both $\mu_{ul,source}$ and $\mu_{dci,source}$ are replaced by the $\mu$ used for calculating the CSI computation time for source cells, and both $\mu_{dci,target}$ and $\mu_{ul,target}$ are replaced by the $\mu$ used for calculating the CSI computation time for the target cells.

When multiplexing is considered, either multiplicative scaling (e.g., $\alpha$ as $\alpha X_{min}$) or additive offset (e.g., $\beta$ as $X_{min}+\beta$) to $X_{min}$ may be implemented. When these are considered, it is also possible to not include SCS configurations of the source cell in the determination of $X_{min}$ since it can be absorbed into the scaling and/or the offset.

Since the processing capability is configured per cell, the system may determine both $N_2$ for the source and target cell by corresponding $\mu$ and the processing capability and selecting the greater of the resulting values.

The minimum time duration (i.e., the cancellation time) $X_{min}$ from the ending symbol of the PDCCH scheduling the UL transmission on the target cell to the starting symbol of a dropped UL signal/channel in source cell, is based on $N_{2,source}$ and $N_{2,target}$. $N_{2,source}$ is a function of the numerology of the scheduling PDCCH on source cell, $\mu_{DCI,source}$, and the numerology of UL channel/signal on the source cell, $\mu_{ul,source}$ ($\mu_{ul,source}=0$ if the UE transmits the PRACH using 1.25 kHz or 5 kHz SCS on the source cell). $N_{2,target}$ is a function of the numerology of the scheduling PDCCH on target cell, $\mu_{dci,target}$, and the numerology of UL channel/signal on the target cell, $\mu_{ul,target}$. It is possible that the source cell and target cell have a different processing capability. In this case, $N_{2,source}$ source corresponds to the processing capability of the source cell and $N_{2,target}$ corresponds to the processing capability of the target cell.

When collision of the UL signal/channel on the target cell and the UL signal/channel on the source cell occurs, if the first symbol of the UL transmission in the source cell, including the effect of the timing advance, is no earlier than symbol L, where L is defined as the UL symbol with its CP starting at $X_{min}=\max\{T_{proc,2,source}, T_{proc,s,target}\}$ after the end of the reception of the last symbol of PDCCH scheduling the UL transmission/signal on the target cell, then the UE may cancel the transmission of the signal/channel in the source cell. $T_{proc,2,source}=(N_{2,source}+d_{2,1})(2048+144) \cdot \kappa 2^{-\mu} \cdot T_c$ and $T_{proc,2,target}=(N_{2,target}+d_{2,1})(2048+144) \cdot \kappa 2^{-\mu} \cdot T_c$. $N_{2,source}$ is based on Table 1 and corresponds to the smallest SCS configuration to the one of ($\mu_{ul,source}$, $\mu_{dci,source}$). $N_{2,source}$ corresponds to the processing capability of source cell. $d_{2,1}$ is defined according to the DMRS configuration as described in sub-clause 6.4 of TS 38.214. The choice of $d_{2,1}$ can also be a fixed value 1 for relaxing the $X_{min}$ to provide a good upper bound for the required cancellation time of different type of uplink transmissions.

$$\kappa = 64, T_c = \frac{1}{480 \times 10^3 \times 4096}.$$

Otherwise, the UE may ignore the dropping of the signal/channel on the source cell.

Figure 5:
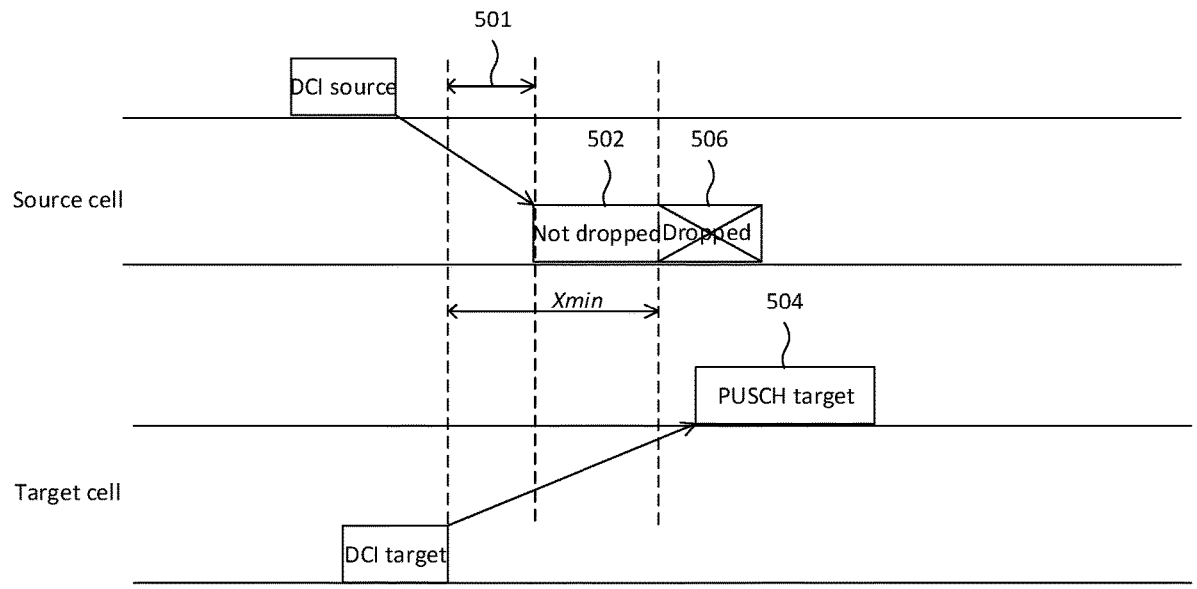
FIG. 5 illustrates a diagram of partial cancellation, according to an embodiment.

FIG. 5 illustrates a diagram of partial cancellation, according to an embodiment. In full cancellation, the UE is assumed to fully drop the transmission on the source cell. Dropping can be done in the middle of the source cell transmission. When the source cell transmission is dropped in the middle of transmission, the quality of transmission may not be guaranteed, which causes performance degradation for the source cell transmission. This performance degradation is in general acceptable as the main motivation behind the dropping is to ensure the quality of the transmission on the target cell. Moreover, if enough of a portion of the source cell transmission is still transmitted, the network may still be able to decode the transmission. FIG. 5 shows an exemplary situation where the time gap 501 between the end of the last symbol of the PDCCH 502 (carrying DCI) and the start of the first symbol of the PUSCH 504 on the source cell, is smaller than the minimum required time (i.e., the cancellation time) $X_{min}$ for the full dropping of the source transmission. If full cancellation is performed, the UE may ignore the overlap to drop the source transmission. On the other hand, the UE may only drop the portion of the source transmission which satisfies the timeline, As shown in FIG. 5, although the time gap 501 is not sufficient for full dropping, the UE only drops the portion 506 of the source transmission which comes after $X_{min}$ from the end of the DCI target.

In some embodiments, the partial dropping is performed based on two numerologies. The timeline dropping may depend on SCS. The minimum time duration $X_{min}$ from the ending symbol of the PDCCH scheduling the UL transmission on the target cell to the start of the dropped symbol of the UL signal/channel in the source cell, is based on $N_2$ as a function of the numerology of the scheduling PDCCH on target cell, $\mu_{DCI,target}$, and the numerology of UL channel/signal on the source cell, $\mu_{ul,source}$ ($\mu_{ul,source}=0$ if the UE transmits the PRACH using 1.25 kHz or 5 kHz SCS on the source cell). It is possible that source cell and target cell have a different processing capability. in this case, $N_2$ corresponds to the minimum capability between the source and target cell, or the processing capability of source cell.

When collision of UL signal/channel on the target cell and UL signal/channel on the source cell occurs, if a symbol of the UL transmission in the source cell, including the effect of the timing advance, is no earlier than symbol L, where L is defined as the UL symbol with its CP starting the $X_{min}=(N_2+d_{2,1})(2048+144) \cdot \kappa 2^{-\mu} \cdot T_c$ (or $T_{proc,2}$) after the end of the reception of the last symbol of the PDCCH scheduling the UL transmission/signal on the target cell, then the UE may cancel/drop the transmission of the symbol on the source cell. The canceled/dropped symbol in the source cell transmission may be any symbol in the transmission. $N_2$ is based on Table 1 and $\mu$ corresponds to the one of ($\mu_{ul,source}$, $\mu_{dci,target}$) resulting in the largest $X_{min}$. Alternatively, $N_2$ is based on Table 1 and corresponds to the smallest SCS configuration to one of ($\mu_{ul,source}$, $\mu_{dci,target}$). It is possible that the source cell and target cell have a different processing capability, In this case. $N_2$ corresponds to the minimum capability between the source and target cell, or the processing capability of source cell. $d_{2,1}$ is defined according to the DMRS configuration as described in sub-clause 6.4 of TS 38.214. The choice of $d_{2,1}$ can also be a fixed value 1 for relaxing the $X_{min}$ to provide a good upper bound for the required cancellation time of different type of uplink transmissions.

$$\kappa = 64, T_c = \frac{1}{480 \times 10^3 \times 4096}.$$

Otherwise, the UE may ignore the dropping of the symbol on the source cell.

When, originally, there are multiple transmissions in source and/or target cells, to acknowledge processing time of multiplexing, the above $X_{min}$ can be replaced by the maximum of $T_{proc,2}^{mux}$, $T_{proc,release}^{mux}$, and $T_{proc,CSI}^{mux}$ based on the configuration where $\mu_{ul,source}$ is replaced by the smallest SCS configuration of all originally overlapping source cell transmissions, and $\mu_{dci,target}$ is replaced by the smallest SCS configuration of PDCCHs for all originally overlapping target cell transmissions.

When the CSI reports are involved in the collision of the source and target cell, to acknowledge the CSI computation, the above $X_{min}$ can be replaced by $T_{proc,CSI}$ where $\mu_{ul,source}$ is replaced by the $\mu$ used for calculating the CSI computation time for the source cells (as described in sub-clause 5.4 of TS 38.214), and $\mu_{dci,target}$ is replaced by the $\mu$ used for calculating CSI computation time for target cells.

When multiplexing is considered, either multiplicative scaling ($\alpha$ as $\alpha X_{min}$) or additive offset ($\beta$ as $X_{min}+\beta$) to $X_{min}$ can be considered. When these are considered, it is also possible not to include SCS configurations of source cell in the determination of $X_{min}$ since it can be absorbed into scaling and/or offset.

Since the processing capability is configured per cell, it may be desirable to determine the both $N_2$ for the source and target cell by corresponding $\mu$ and the processing capability and selecting the larger of the resulting values. The minimum time duration $X_{min}$ from the ending symbol of the PDCCH scheduling the UL transmission on the target cell to starting symbol of a dropped UL signal/channel in the source cell, is dependent on $N_{2,source}$ and $N_{2,target}$. $N_{2,source}$ is a function of the numerology of UL channel/signal on the source cell, $\mu_{ul,source}$ ($\mu_{ul,source}=0$ if the LIE transmits the PRACH using 1,25 kHz or 5 kHz SCS on the source cell) and the processing capability of the source cell. $N_{2,target}$ is a function of the numerology of the scheduling PDCCH on the target cell, $\mu_{DCI,target}$ and the processing capability of the target cell.

When collision of the UL signal/channel on the target cell and the UL signal/channel on the source cell occurs, if the first symbol of the UL transmission in the source cell, including the effect of the timing advance, is no earlier than symbol L, where L is defined as the UL symbol with its CP starting $X_{min}=\max\{T_{proc,2,source}, T_{proc,2,target}\}$ after the end of the reception of the last symbol of the PDCCH scheduling the UL transmission/signal on the target cell, then the UE may cancel the transmission of the signal/channel in the source cell. $T_{proc,2,source}=(N_{2,source}+d_{2,1})$ $(2048+144) \cdot \kappa 2^{-\mu} \cdot T_c$ and $T_{proc,2,target}=(N_{2,target}+d_{2,1})$ $(2048+144) \cdot \kappa 2^{-\mu} \cdot T_c$. $N_{2,source}$ is based on Table 1, where $\mu$ corresponds to $\mu_{ul,source}$ and the processing capability corresponds to the source cell. $N_{2,target}$ is based on Table 1, where $\mu$ corresponds to $\mu_{dci,target}$ and the processing capability corresponds to the source cell. $d_{2,1}$ is defined according to the DMRS configuration as described in sub-clause 6.4 of TS 38.214. The choice of $d_{2,1}$ can also be a fixed value 1 for relaxing the $X_{min}$ to provide a good upper bound for the required cancellation time of different type of uplink transmissions.

$$\kappa = 64, T_c = \frac{1}{480 \times 10^3 \times 4096}.$$

Otherwise, the UE may ignore the dropping of the symbol on the source cell.

In some embodiments, partial dropping is performed based on four numerologies. Using four numerologies considers the numerologies of scheduling DCI on the source cell and the numerology of the UL transmission on the target cell to determine the minimum time duration $X_{min}$. The minimum time duration $X_{min}$ from the ending symbol of the PDCCH scheduling the UL transmission on the target cell to start of a dropped symbol of the UL signal/channel in the source cell, is based on $N_2$ as a function of the numerology of the scheduling PDCCH on the target cell, $\mu_{DCI,target}$, the numerology of the UL channel/signal on the source cell, $\mu_{ul,source}$ ($\mu_{ul,source}=0$ if the UE transmits the PRACH using 1.25 kHz or 5 kHz SCS on the source cell), and the numerology of the scheduling PDCCH on the source cell, $\mu_{dci,source}$ (if any). It may also depend on numerology of UL channel/signal on the target cell, $\mu_{ul,target}$. It is possible that the source cell and target cell have a different processing capability. In this case, $N_2$ corresponds to the minimum capability between the source and target cell, or the processing capability of the source cell.

When collision of the UL signal/channel on the target cell anti the UL signal/channel on the source cell occurs, if a symbol of the UL transmission in the source cell, including the effect of the timing advance, is no earlier than symbol L, where L is defined as the UL symbol with its CP starting $X_{min}=(N_2+d_{2,1})(2048+144)$. $\kappa 2^{-\mu}$. $T_c$ (or $T_{proc,2}$) after the end of the reception of the last symbol of the PDCCH scheduling the UL transmission/signal on the target cell, then the UE may cancel/drop the transmission of the symbol on the source cell. The canceled/dropped symbol in the source cell transmission may be any symbol in the transmission. N, is based on Table 1 and μ corresponds to the one of ($\mu_{ul,source}$, $\mu_{dci,target}$, $\mu_{ul,target}$, $\mu_{dci,source}$) resulting in the largest $X_{min}$. Alternatively, $N_2$ is based on Table 1 and μ corresponds to the smallest SCS configuration to one of ($\mu_{ul,source}$, $\mu_{dci,target}$, $\mu_{ul,target}$, $\mu_{dci,source}$). It is possible that the source cell and target cell have a different processing capability. In this case, $N_2$ corresponds to the minimum capability between the source and target cell, or corresponds to the processing capability of the source cell. $d_{2,1}$ is defined according to the DMRS configuration as described in sub-clause 6.4 of TS 38.214. The choice of $d_{2,1}$ can also be a fixed value 1 for relaxing the $X_{min}$ to provide a good upper bound for the required cancellation time of different type of uplink transmissions.

$$\kappa = 64, T_c = \frac{1}{480 \times 10^3 \times 4096}.$$

Otherwise, the UE may ignore the dropping of the symbol on the source cell.

When, originally, there are multiple transmissions in source and/or target cells, to acknowledge processing time of multiplexing the above $X_{min}$ can be replaced by the maximum of $T_{proc,2}^{mux}$, $T_{proc,release}^{mux}$, and $T_{proc,CSI}^{mux}$ based on the configuration where $\mu_{ul,source}$ is replaced by SCS configurations of all originally overlapping source cell transmissions, and $\mu_{ul,source}$ is replaced replaced by SCS configurations of PDCCH's for all originally overlapping target cell transmissions. $\mu_{ul,target}$ is replaced by SCS configurations of all originally overlapping target cell transmissions, and $\mu_{dci,source}$ is replaced by SCS configurations of PDCCH's for all originally overlapping source cell transmissions.

When the CSI reports are involved in the collision of the source and target cell, to acknowledge of CSI computation, the above $X_{min}$ can be replaced by $T_{proc,CSI}$, where both $\mu_{ul,source}$ and $\mu_{dci,source}$ are replaced by the it used for calculating the CSI computation time for source cells (as described in sub-clause 5.4 of TS 38.214 and both $\mu_{dci,target}$ and $\mu_{ul,target}$ are replaced by the it used for calculating the CSI computation time for target cells.

When multiplexing is considered, either multiplicative scaling (α as $\alpha X_{min}$) or additive offset (β as $X_{min}+\beta$) to $X_{min}$ can be considered. When these are considered, it is also possible not to include SCS configurations of the source cell in the determination of $X_{min}$ since it can be absorbed into scaling and/or offset.

Since the processing capability is configured per cell, it may be desirable to determine both $N_2$ for the source and target cell by corresponding μ and the processing capability and selecting the larger of the resulting values. The minimum time duration $X_{min}$ from the ending symbol of the PDCCH scheduling the UL transmission on the target cell to the starting symbol of a dropped UL, signal/channel in the source cell, is based on $N_{2,source}$ and $N_{2,target}$. $N_{2,source}$ is a function of the numerology of the scheduling PDCCH on the source cell, $\mu_{DCI,source}$ and the numerology of the LT channel/signal on the source cell, $\mu_{ul,source}$ ($\mu_{ul,source}=0$ if the UE transmits the PRACH using 1.25 kHz or 5 kHz SCS on the source cell). $N_{2,target}$ is a function of the numerology of the scheduling PDCCH on the target cell, $\mu_{dci,target}$ and the numerology of the UL channel/signal on the target cell, $\mu_{ul,target}$. It is possible that the source cell and target cell have a different processing capability. In this case, $N_{2,source}$ corresponds to the processing capability of the source cell and $N_{2,target}$ corresponds to the processing capability of the target cell.

When collision of the UL signal/channel on the target cell and the UL signal/channel on the source cell occurs, if the first symbol of the UL transmission in the source cell, including the effect of the timing advance, is no earlier than symbol L, where L is defined as the UL symbol with its CP starting $K_{min}=\max\{T_{proc,2,source}, T_{proc,2,target}\}$ after the end of the reception of the last symbol of PDCCH scheduling the UL transmission/signal on the target cell, then the LT may cancel the transmission of the signal/channel in the source cell. $T_{proc,2,source}=(N_{2,source}+d_{2,1})(2048+144)$. $\kappa 2^{-\mu}$. $T_c$ and $T_{proc,2,target}=(N_{2,target}+d_{2,1})(2048+144)$. $\kappa 2^{-\mu}$. $T_c$. $N_{2,source}$ is based on Table 1 and μ corresponds to the smallest SCS configuration to one of ($\mu_{ul,source}$, $\mu_{dci,source}$). $N_{2,source}$ corresponds to the processing capability of the source cell. $N_{2,target}$ is based on Table 1 and μ corresponds to the smallest SCS configuration to one of ($\mu_{dci,target}$, $\mu_{ul,target}$). $N_{2,target}$ corresponds to the processing capability of the target cell. $d_{2,1}$ is defined according to the DMRS configuration as described in sub-clause 6.4 of TS 38.214. The choice of $d_{2,1}$ can also be a fixed value 1 for relaxing the $X_{min}$ to provide a good upper bound for the required cancellation time of different type of uplink transmissions.

$$\kappa = 64, T_c = \frac{1}{480 \times 10^3 \times 4096}.$$

Otherwise, the UE may ignore the dropping of the symbol on the source cell.

Figure 6:
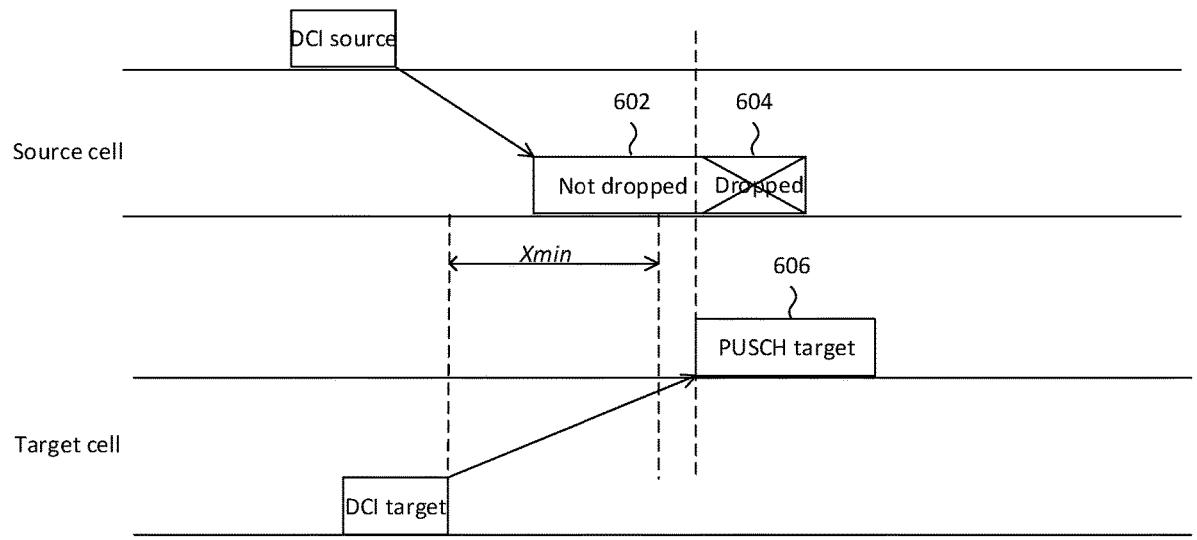
FIG. 6 illustrates a diagram of partial cancellation, according to an embodiment.

FIG. 6 illustrates a diagram of partial cancellation, according to an embodiment. in FIG. 5, the timeline is defined without regarding the actual start of transmission to the target cell. As shown in FIG. 5, some part of the dropped portion of the source transmission does not overlap with the target cell transmission. There may not be a need to drop the non-overlapping portion as long as it satisfies the timeline. As shown in FIG. 6, the UE may only drop the portion 604 of the source transmission 602 which overlaps with the target transmission 606.

The dropping may be performed based on two numerologies. When collision of the UL signal/channel on the target cell and the UL signal/channel on the source cell occurs, if a symbol of the UL transmission in the source cell, including the effect of the timing advance, is no earlier than symbol L and overlaps with a symbol of the UL transmission on the target cell, where L is defined as the UL symbol with its CP starting $X_{min}=(N_2+d_{2,1})(2048+144) \cdot \kappa 2^{-\mu} \cdot T_c$ (or $T_{proc,2}$) after the end of the reception of the last symbol of the PDCCH scheduling the UL channel/signal on the target cell, then the UE may cancel/drop the transmission of the symbol on the source cell. $N_2$ is based on Table 1 and $\mu$ corresponds to the smallest SCS configuration to one of ($\mu_{ul,source}$, $\mu_{dci,target}$). It is possible that the source cell and target cell have a different processing capability. In this case, $N_2$ corresponds to the minimum capability between the source and target cell, or the processing capability of the source cell. $d_{2,1}$ is defined according to the DMRS configuration as described in sub-clause 6.4 of IS 38.214. The choice of $d_{2,1}$ can also he a fixed value 1 for relaxing the $X_{min}$ to provide a good upper bound for the required cancellation time of different type of uplink transmissions.

$$\kappa = 64, T_c = \frac{1}{480 \times 10^3 \times 4096}.$$

Otherwise, the UE may ignore the dropping of the symbol on the source cell. Alternatively, the UE behavior on possible transmission of the overlapping symbols on the source and target cells depends on UE implementation. The UE may or may not drop the symbol on the target or source cell transmission.

When, originally, there are multiple transmissions in the source and/or target cells, to acknowledge processing time of multiplexing, the above $X_{min}$ can be replaced by $T_{proc,2}^{mux}$, $T_{proc,release}^{mux}$, and $T_{proc,CSI}^{mux}$ based on the configuration where It r-ul,source is replaced by the smallest SCS configuration of all originally overlapping source cell transmissions, and $\mu_{dci,target}$ is replaced by the smallest SCS configuration of PDCCH's for all originally overlapping target cell transmissions.

When the CSI reports are involved in the collision of the source and target cell, to acknowledge the CSI computation, the above $X_{min}$ can be replaced by the maximum of $T_{proc,CSI}$, where $\mu_{ul,source}$ is replaced by the $\mu$ used for calculating the CSI computation time for the source cells, and $\mu_{dci,target}$ is replaced by the $\mu$ used for calculating the CSI computation time for the target cells.

When multiplexing is considered, either multiplicative scaling ($\alpha$ as $\alpha X_{min}$) or additive offset ($\beta$ as $X_{min}+\beta$) to $X_{min}$ can be considered. When these are considered, it is also possible not to include SCS configurations of the source cell in the determination of $X_{min}$ since it can be absorbed into scaling and/or offset.

Since the processing capability is configured per cell, it may be desirable to determine the both $N_2$ for the source and target cell by corresponding $\mu$ and the processing capability and selecting the larger of the resulting values. With two numerologies, when collision of the UL signal/channel on the target cell and the UL signal/channel on the source cell occurs, if the first symbol of the UL transmission in the source cell, including the effect of the timing advance, is no earlier than symbol L, where L is defined as the UL symbol with its CP starting $X_{min}=\max\{T_{proc,2,source}, T_{proc,2,target}\}$ after the end of the reception of the last symbol of PDCCH scheduling the UL transmission/signal on the target cell, then the UE may cancel the transmission of the signal/channel in the source cell. $T_{proc,2,source}=(N_{2,source}+d_{2,1})(2048+144) \cdot \kappa 2^{-\mu} \cdot T_c$ and $T_{proc,2,target}=(N_{2,target}+d_{2,1})(2048+144) \cdot \kappa 2^{-\mu} \cdot T_c$. $N_{2,source}$ is based on Table 1, where $\mu$ corresponds to $\mu_{ul,source}$ and the processing capability corresponds to the one with the source cell. $N_{2,target}$ is based on Table 1, where $\mu$ corresponds to $\mu_{dci,target}$ and the processing capability corresponds to the one with the source cell. $d_{2,1}$ is defined according to the DMRS configuration as described in sub-clause 6.4 of TS 38.214. The choice of $d_{2,1}$ can also be a fixed value 1 for relaxing the $X_{min}$ to provide a good upper bound for the required cancellation time of different type of uplink transmissions.

$$\kappa = 64, T_c = \frac{1}{480 \times 10^3 \times 4096}.$$

With four numerologies, when collision of the UL signal/channel on the target cell and the UL signal/channel on the source cell occurs, if a symbol of the UL transmission in the source cell, including the effect of the timing advance, is no earlier than symbol L and overlaps with a symbol of the UL transmission on the target cell, where L is defined as the UL symbol with its CP starting $X_{min}=(N_2+d_{2,1})(2048+144) \cdot \kappa 2^{-\mu} \cdot T_c$ (or $T_{proc,2}$) after the end of the reception of the last symbol of the PDCCH scheduling the UL channel/signal on the target cell, then the UE may cancel/drop the transmission of the symbol on the source cell, $N_2$ is based on Table 1 and $\mu$ corresponds to the smallest SCS configuration to one of ($\mu_{ul,source}$, $\mu_{dci,target}$, $\mu_{ul,target}$, $\mu_{dci,source}$). It is possible that the source cell and target cell have different processing capability $N_2$. In this case, $N_2$ corresponds to the minimum capability between the source and target cell, or the processing capability of the source cell. $d_{2,1}$ is defined according to the DMRS configuration as described in sub-clause 6.4 of TS 38.214.

$$\kappa = 64, T_c = \frac{1}{480 \times 10^3 \times 4096}.$$

Otherwise, the UE may ignore the dropping of the symbol on the source cell. Alternatively, the UE behavior on possible transmission of the overlapping symbols on the source and target cells is up to UE implementation. The UE may or may not drop the symbol on the target or source cell transmission.

When, originally, there are multiple transmissions in the source and/or target cells, to acknowledge the processing time of multiplexing, the above $X_{min}$ can be replaced by the maximum of $T_{proc,2}^{mux}$, $T_{proc,release}^{mux}$, and $T_{proc,CSI}^{mux}$ based on the configuration where $\mu_{ul,source}$ is replaced by SCS configurations of all originally overlapping source cell transmissions, and U is replaced by SCS configurations of PDCCHs for all originally overlapping target cell transmissions. $\mu_{ul,target}$ is replaced by SCS configurations of all originally overlapping target cell transmissions, and $\mu_{dci,source}$ is replaced by SCS configurations of PDCCH's for all originally overlapping source cell transmissions.

When the CSI reports are involved in the collision of the source and target cell, to acknowledge the CSI computation, the above $X_{min}$ can be replaced by $T_{proc,CSI}$, where both $\mu_{ul,source}$ and $\mu_{dci,source}$ are replaced by the $\mu$ used for calculating the CSI computation time for the source cells, and both $\mu_{dci,target}$ and $\mu_{ul,target}$ are replaced by the $\mu$ used for calculating the CSI computation time for the target cells.

When multiplexing is considered, either multiplicative scaling ($\alpha$ as $\alpha X_{min}$) or additive offset ($\beta$ as $X_{min}+\beta$) to $X_{min}$ can be considered. When these are considered, it is also possible not to include SCS configurations of the source cell in the determination of $X_{min}$ since it can be absorbed into scaling and/or offset.

Since the processing capability is configured per cell, it may be desirable to determine the both $N_2$ for the source and target cell by corresponding p. and the processing capability and selecting the larger of the resulting values. With four numerologies, when collision of the UL signal/channel on the target cell and the UL signal/channel on the source cell occurs, if the first symbol of the UL transmission in the source cell, including the effect of the timing advance, is no earlier than symbol L, where L is defined as the UL symbol with its CP starting $X_{min}$=max $\{T_{proc,2,source}, T_{proc,2,target}\}$ after the end of the reception of the last symbol of the PDCCH scheduling the UL transmission/signal on the target cell, then the UE may cancel the transmission of the signal/channel in the source cell. $T_{proc,2,source}=(N_{2,source}+d_{2,1})(2048+144)$. $\kappa 2^{-\mu}$. $T_c$ and $T_{proc,2,target}=(N_{2,target}+d_{2,1})(2048+144)$. $\kappa 2^{-\mu}$. $T_c$. $N_{2,source}$ is based on Table 1 and $\mu$ corresponds to the smallest SCS configuration to one of ($\mu_{ul,source}, \mu_{dci,source}$). $N_{2,source}$ corresponds to the processing capability of the source cell. $N_{2,target}$ is based on Table 1 and $\mu$ corresponds to the smallest SCS configuration to one of ($\mu_{dci,target}, \mu_{ul,target}$). $N_{2,target}$ corresponds to the processing capability of the target cell. $d_{2,1}$ is defined according to the DMRS configuration as described in sub-clause 6.4 of TS 38.214. The choice of $d_{2,1}$ can also be a fixed value 1 for relaxing the $X_{min}$ to provide a good upper bound for the required cancellation time of different type of uplink transmissions.

$$\kappa = 64, T_c = \frac{1}{480 \times 10^3 \times 4096}.$$

Otherwise, the UE may ignore the dropping of the symbol on the source cell. Alternatively, the UE behavior on the possible transmission of the overlapping symbols on the source and target cells depends on the UE implementation. The UE may or may not drop the symbol on the target or source cell transmission.

Figure 7:
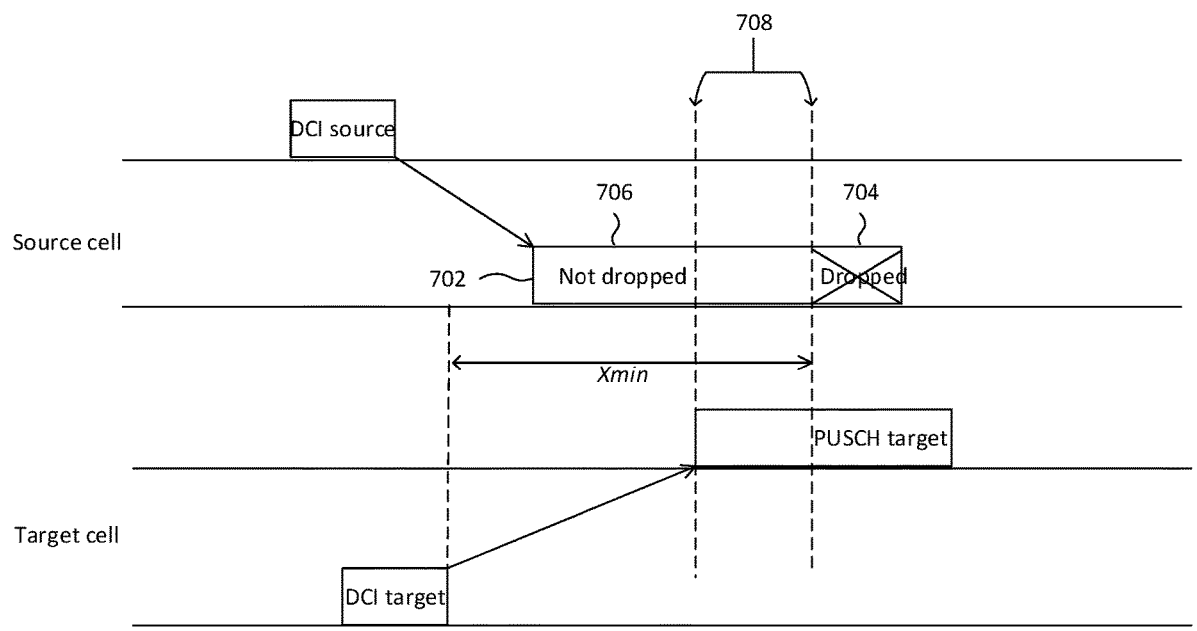
FIG. 7 illustrates a diagram of partial cancellation, according to an embodiment.

FIG. 7 illustrates a diagram of partial cancellation, according to an embodiment. As shown in FIG. 7, any overlapping portion 704 of the UL transmission 702 on the source cell which comes after the cancellation time $X_{min}$ will be dropped. Any non-overlapping symbols 706 on the source cell 702. will be transmitted. For the symbols 708 of the source transmission which come before $X_{min}$ after the end of the PDCCH on the target cell (carrying the DCI target) and overlap with the UL transmission on the target cell, the UE behavior is up to UE implementation. In these symbols, the UE may or may not drop the target cell and/or the source cell transmission.

In some embodiments, a PRACH is on the target cell. When the colliding channel on the target cell is an Msg1 preamble, since there is no scheduling DCI, the time duration is specified from the moment that the physical layer of the UE becomes aware of the PRACH Msg1 transmission. This point is referred to as point P. In some embodiments, the minimum time duration $X_{min}$ from point P to the start of a dropped symbol of the UL transmission in the source cell is based on $N_2$ as a function of the numerology of the UL channel/signal on the source cell, $\mu_{ul,source}$ ($\mu_{ul,source}=0$ if the UE transmits the PRACH using 1.25 kHz or 5 kHz SCS on the source cell). For full dropping, when collision of the UL signal/channel on the target cell and the UL signal/channel on the source cell occurs, where the UL channel/signal on target cell carries Msg1, if the first symbol of the UL transmission in the source cell, including the effect of the timing advance, is no earlier than symbol L, where L is defined as the UL symbol with its CP starting $X_{min}=(N_2+d_{2,1})(2048+144)$. $\kappa 2^{-\mu}$. $T_c$ (for $T_{proc,2}$) after point P, then the UE may cancel/drop the transmission in the transmission on the source cell. $N_2$ is based on Table 1 and $\mu=\mu_{ul,source}$. $d_{2,1}$ is defined according to the DMRS configuration as described in sub-clause 6.4 of TS 38.214.

$$\kappa = 64, T_c = \frac{1}{480 \times 10^3 \times 4096}.$$

Otherwise, the UE may ignore the dropping of the signal/channel on the source cell For partial dropping, when collision of the UL signal/channel on the target cell and the UL signal/channel on the source cell occurs, where the UL channel/signal on the target cell carries Msg1, and if a symbol of the UL transmission in the source cell, including the effect of the timing advance, is no earlier than symbol L, where L is defined as the UL symbol with its CP starting $X_{min}=(N_2+d_{2,1})(2048 +144)$. $\kappa 2^{-\mu}$. $T_c$ (or $T_{proc,2}$) after point P, then the UE may cancel/drop the transmission of the symbol in the transmission on the source cell. $N_2$ is based on Table 1 and $\mu=\mu_{ul,source}$. $d_{2,1}$ is defined according to the DMR S configuration as described in sub-clause 6.4 of TS 38.214. The choice of $d_{2,1}$ can also be a fixed value 1 for relaxing the $X_{min}$ to provide a good upper bound for the required cancellation time of different type of uplink transmissions.

$$\kappa = 64, T_c = \frac{1}{480 \times 10^3 \times 4096}.$$

Otherwise, the UE may ignore the dropping of the symbol on the source cell.

If the UL signal/channel on the target cell is Msg3, the Msg3 grant is conveyed in the PDSCH carrying random access channel (RACH) response (RAR) message. This PDSCH acts as a scheduling PDCCH and the PDSCH can be considered as the reference point to define the dropping timeline. The minimum time duration $X_{min}$ from the ending symbol of the PDSCH conveying a RAR message on the target cell to the start of a dropped symbol of the UL transmission in the source cell, is based on $N_1$ and $N_2$ as a function of $\mu_{dl,target}$ and $\mu_{ul,source}$. It is possible that the source cell and target cell have a different processing capability $N_1$ and $N_2$. In this case, in some UE implementations, $N_1$ and $N_2$ corresponds to the minimum capability between the source and target cell. Alternatively, in some UE implementations, $N_1$ corresponds to the capability of the target cell, and $N_2$ corresponds to the capability of the source cell.

In full dropping, when collision of the UL signal/channel on the target cell and the UL signal/channel on the source cell occurs, where the UL channel/signal on the target cell carries Msg3, and if the time duration from the end of the last symbol of the PDSCH conveying the RAR message to the first symbol of the UL transmission in the source cell is not shorter than $X_{min}=N_1+N_2+0.5$ msec, or $T_{proc,2}+T_{proc,2}+0.5$ msec, then the UE may drop the transmission in the source cell. $N_2$ is based on Table 1 and $\mu=\mu_{ul,source}$. $N_1$ is based on Table 2 and $\mu=\mu_{dl,target}$. Alternatively, $N_1$ and $N_2$ correspond to the smaller SCS configuration among $\mu=\mu_{dl,target}$. It is possible that the source cell and the target cell have a different processing capability $N_1$ and $N_2$. In this case, in some UE implementations, $N_1$ and $N_2$ corresponds to the minimum capability between the source and target cell. Alternatively, in some UE implementations, $N_1$ corresponds to the capability of the target cell, and $N_2$ corresponds to capability of the source cell. Otherwise, the UE may ignore the dropping of the signal/channel on the source cell.

In partial dropping, when collision of the UL signal/channel on the target cell and the UL signal/channel on the source cell occurs, where the UL channel/signal on the target cell carries Msg3, and if the time duration from the end of the last symbol of the PUSCH conveying the RAR message to the start of a symbol of the UL, transmission in the source cell is not shorter than $X_{min}=N_1+N_2+0.5$ msec, or $T_{proc,2}+0.5$ msec, then the UE may drop the transmission of the symbol in the source cell. $N_2$ is based on Table 1 and $\mu=\mu_{ul,source}$. $N_1$ is based on Table 2 and $\mu=\mu_{dl,target}$. Alternatively, $N_1$ and $N_2$ correspond to the smaller SCS configuration among $\mu_{ul,source}$ and $\mu_{dl,target}$. It is possible that the source cell and target cell have a different processing capability $N_1$ and $N_2$. In this case, in some UE implementations, $N_1$ and $N_2$ corresponds to the minimum capability between the source and target cell. Alternatively, in some UE implementations, $N_1$ corresponds to capability of the target cell, and $N_2$ corresponds to the capability of the source cell. Otherwise, the UE may ignore the dropping of the symbol on the source cell.

If the UE does not provide ULPowerSharingDAPS-HO in the UE transmissions on the target cell and the source cell, the UE transmits only on the target cell, and cancels the transmission to source cell after the PUSCH preparation time $T_{proc,2}$ for the corresponding PUSCH processing capability, assuming $d_{2,1}=1$ after a last symbol of a CORESET where the UE detects a DCI format scheduling the transmission on the target cell and p. corresponds to the smallest SCS configuration between the SCS configuration of the PDCCH carrying the DCI format and the SCS configuration of the UE transmission on the source cell. If the UE transmits a PRACH using 1.25 kHz or 5 kHz SCS on the source cell, the UE determines $T_{proc,2}$, assuming SCS configuration $\mu=0$. A UE does not expect to cancel a transmission on the source cell (in symbols from the set of symbols) that occur, relative to a last symbol of a CORESET where the UE detects a DCI format scheduling a transmission on the target cell, after a number of symbols that is smaller than the PUSCH preparation time $T_{proc,2}$ for the corresponding PUSCH processing capability, assuming $d_{2,1}=1$ and $\mu$ corresponds to the smallest SCS configuration between the SCS configuration of the PDCCH carrying the DCI format and the SCS configuration of the UE transmission on the source cell. If the UE transmits the PRACH using 1.25 kHz or 5 kHz SCS on the source cell, the UE determines $T_{proc,2}$, assuming SCS configuration $\mu=0$. There may be a special value $\mu$ for PRACH using 1,25 kHz or 5 kHz SCS on the source cell (the UE determines $T_{proc,2}$, assuming SCS configuration $\mu=0$). d2,1 may be 1 for relaxing the $T_{proc,2}$ calculation. Since the transmissions may not be PUSCH, when determining the timeline, using the value of 1 provides a good bound for various transmissions.

The time offset between last symbol of COREST where the UE detects the PDCCH carrying the DCI format and the first symbol which the UE is mandated to cancel is the PUSCH preparation time $T_{proc,2}$ defined in TS 38.214. $T_{proc,2}$ provides a reasonable timeline requirement for the UE for canceling the general UL transmission.

There is one fundamental difference between msg3 and other dynamic grant based transmissions. Instead of PDCCH, the msg3 grant is conveyed in the PDSCH carrying a RAR message. The procedure of conveying such information involves some higher layer process. Therefore, the gap between PDSCH carrying RAR message and msg3 is $T_{proc,1}+T_{proc,2}+0.5$ ms, which involves the msg2 process time (i.e., decoding time and higher layer processing: $T_{proc,1}+0.5$ ms) and msg3 preparation time ($T_{proc,2}$).

To define a cancellation timeline due to msg3, the overall processing time for cancellation is $T_{proc,1}+T_{proc,2}+0.5$ ms. For $T_{proc,1}$ and $T_{proc,2}$, SCS is chosen from the minimum of the source and target cell SCS and processing capability.

If the UE does not provide ULPowerSharingDAPS-HO, and UE transmissions on the target cell and the source cell overlap, the UE transmits only on the target cell, and cancels the transmission to source cell after the PUSCH preparation time $T_{proc,2}$ for the corresponding PUSCH processing capability, assuming $d_{2,1}=1$ after a last symbol of a CORESET where the UE detects a DCI, format scheduling the transmission on the target cell and u corresponds to the smallest SCS configuration between the SCS configuration of the PDCCH carrying the DCI format and the SCS configuration of the UE transmission on the source cell. If the UE transmits the PRACH using 1.25 kHz or 5 kHz SCS on the source cell, the UE determines assuming SCS configuration $\mu=0$.

A UE does not expect to cancel a transmission on the source cell in symbols from the set of symbols that occur, relative to a last symbol of a CORESET where the UE detects a DCI format scheduling a transmission on the target cell, after a number of symbols that is smaller than the PUSCH preparation time $T_{proc,2}$ for the corresponding PUSCH processing capability, assuming $d_{2,1}=1$ and $\mu$ corresponds to the smallest SCS configuration between the SCS configuration of the PDCCH carrying the DCI format and the SCS configuration of the UE transmission on the source cell. If the UE transmits PRACH using 1.25 kHz or 5 kHz SCS on the source cell, the UE determines $T_{proc,2}$, assuming SCS configuration $\mu=0$.

A UE does not expect to cancel a transmission on the source cell in symbols from the set of symbols that occur, relative to a last symbol of a PDSCH reception conveying a RAR message with a RAR UL grant on the target cell, after a number of symbols that is smaller than $N_{T,1}+N_{T,2}+0.5$ msec, where $N_{T,1}$ is a time duration of $N_1$ symbols corresponding to a PDSCH processing time for UE processing capability when additional PDSCH DMRS is configured, $N_{T,2}$ is a time duration of $N_2$ symbols corresponding to a PUSCH preparation time for UE processing capability and the UE considers that $N_1$ and $N_2$ correspond to the smaller of the SCS configurations for the PDSCH on the target cell and the transmission on the source cell. For $\mu=0$, the UE assumes $N_{1,0}=14$.

The above may be adopted for the UL cancellation timeline to the source master cell group (MCG). If a UE is configured with DAPS handover operation, the UE performs transmission power control based on Section 7.6.2 of 38.213 replacing the MCG with target MCG and SCG with source MCG. The agreement was implemented in Clause 15 of TS 38.213 as in Table 3.

TABLE 3

If the UE indicates ULPowerSharingDAPS-HO = Semistatic-mode1 and is provided ULPowerSharingDAPS-HO-mode = Semi-static-mode1, the UE determines a transmission power for the target MCG or for the source MCG as described in Clause 7.6.2 for ULPowerSharingDAPS-HO = Semi-static-mode1 by considering the target MCG as the MCG and the source MCG as the SCG.
If the UE indicates ULPowerSharingDAPS-HO = Semistatic-mode2 and is provided ULPowerSharingDAPS-HO-mode = Semi-static-mode2, the UE determines a transmission power for the target MCG or for the source SCG as described in Clause 7.6.2 for ULPowerSharingDAPS-HO = Semi-static-mode2 by considering the target MCG as the MCG and the source MCG as the SCG.
If the UE indicates ULPowerSharingDAPS-HO = Dynamic and is provided ULPowerSharingDAPS-HO-mode = Dynamic, the UE determines a transmission power for the target MCG or for the source MCG as described in Clause 7.6.2 for ULPowerSharingDAPS-HO = Dynamic by considering the target MCG as the MCG and the source MCG as the SCG.

In RAN1-100 bis-E, the following UE features for power sharing mode during a DAPS handover were agreed in Table 4.

TABLE 4

| 21-2 | Basic UE power sharing for DAPS HO | Support of semi-static power sharing mode1 |
|---|---|---|
| 21-2a | Semi-static UL power sharing mode 2 for DAPS HO | Support of semi-static power sharing mode 2 |
| 21-2b | Dynamic UL power sharing for DAPS HO | Support of dynamic power sharing |

In addition, the gNB can configure the UE for a specific power sharing mode for DAPS, and the gNB can disable power sharing between target and source MCG. No power sharing between the target and source MCG can be indicated by the gNB not configuring the ULPowerSharingDAPS-HO-mode.

If the UE indicates ULPowerSharing DAPS-HO=Semi-static-mode 1 and is provided ULPowerSharingDAPS-HO-mode=Semi-static-mode 1, the UE determines a transmission power for the target MCG or for the source MCG for NR-DC-PC-mode=Semi-static-mode1 by considering the target MCG as the MCG and the source MCG as the secondary cell group (SCG).

If the UE indicates ULPowerSharingDAPS-HO=Semi-static-mode 2 and is provided ULPowerSharingDAPS-HO-mode=Semi-static-mode 2, the UE determines a transmission power for the target MCG or for the source SCG for NR-DC-PC-mode=Semi-static-mode 2 by considering the target MCG as the MCG and the source MCG as the SCG.

If the UE indicates ULPowerSharingDAPS-HO=Dynamic and is provided ULPowerSharingDAPS-HO-mode=Dynamic, the UE determines a transmission power for the target MCG or for the source MCG for NR-DC-PC-mode=Dynamic by considering the target MCG as the MCG and the source MCG as the SCG.<unchanged text omitted>.

The agreements in Table 5 were reached in RAN1-99 meeting.

TABLE 5

| Agreement: |
|---|
| Confirm WA from RAN1 #98bis on UL transmission of signals/channels for DAPS handover with the following changes:<br>    Collision (in above) is defined for the following cases:<br>        physical time resources for UL channel/signals partially or fully overlap for the intra-frequency intra-band scenario.<br>        physical time and frequency resources for UL channel/signals partially or fully overlap in time and frequency for any other scenario.<br>    Note: Cases when UE realizes UL transmission collides after transmission to the source/target cell is ongoing can be discussed during the CR review.<br>UL transmission dropping when UL transmission of signals/channels to source and target cell collide should apply to all combination of UL channel/signals (i.e. prioritize target)<br>If UE supporting DAPS handover indicates that UE is not capable of supporting simultaneous UL transmission to source and target cell, UE will drop transmission of source cell if UL transmissions of source and target cell overlap in time. Otherwise, UE transmits UL signals/channels to both source and target cell in DAPS HO. |

This means that the UE behavior for canceling UL transmissions to source cells should be, if a UE does not support simultaneous transmission (i.e., not providing ULPowerSharingDAPS-HO), a UE would need to drop source cell transmission if source and target cell UL overlap in time and even if a UE supports simultaneous transmission (i.e., providing ULPowerSharingDAPS-HO), if transmissions collide which are defined for intra-frequency intra-band and inter-frequency intra-band, then a UE would still drop the source cell transmission.

However, the current spec in 38.213 restricts the cancellation conditions to "if a UE does not support simultaneous Tx, and if transmission overlap", which is different from the RAN1-99 meeting agreement. During RAN1-100e, there was a consensus to allow the network to configure the UE to always perform the strict prioritization of the target transmissions. The network can force this mode by not configuring ULPowerSharingDAPS-HO-mode. This mode is further endorsed by an agreement in RAN1-100 bis-E.

The UE behavior may act the same as the indicates supporting none of the power sharing modes (i.e., Semi-static-mode 1, Semi-static-mode2 and Dynamic). In other words, the UE will only transmit to the target cell if there are transmissions overlapping in time, The dropping or cancellation of transmissions to the source cell should follow the cancellation timeline.

The following method in Table 6 is disclosed.

TABLE 6

If
    the UE does not provide ULPowerSharingDAPS-HO, or is not provided ULPowerSharingDAPS-HO-Mode and
    UE transmissions on the target cell and the source cell are in overlapping time resources
or
    the UE is provided ULPowerSharingDAPS-HO-Mode, and
    UE transmissions on the target cell and the source cell overlap
the UE transmits only on the target cell
UE transmissions on the target cell and the source cell overlap if they are in
    overlapping time resources if the carrier frequencies for the target MCG and the source MCG are
    intra-frequency and intra-band
    overlapping time resources and overlapping frequency resources if the carrier frequencies
  for the target MCG and the source MCG are not intra-frequency and intra-band
For intra-frequency DAPS handover operation, the UE expects that an active DL bandwidth part
(BWP) and an active UL BWP on the target cell are within an active DL BWP and an active UL BWP
on the source cell, respectively.
The UE determines intra-frequency as described in Clause 9.2.1 of [10, TS38.133].

For an intra-frequency DAPS handover operation, the UE expects that an active DL BWP and an active UL BWP on the target cell are within an active DL BWP and an active UL BWP on the source cell, respectively. If the UE is provided search space sets on both the target MCG and the source MCG, the UE does not expect to have in any slot any universal synchronization signal (USS) set without allocated PDCCH candidates for monitoring on both the target MCG and the source MCG. This can be adopted for removing PDCCH blind decoding capabilities for MCG1/2 during a DAPS handover.

For UL collision of the source PRACH and target PUSCH/physical UL control channel (PUCCH)/sounding reference signal (SRS), the UE may drop the PRACH when the PRACH transmission in the source and the PUSCH/PUCCH/SRS in target cell are in same slot or separated by less than N symbols. For a DAPS operation in a same frequency band, a UE does not transmit a PUSCH/PUCCH/SRS to the source MCG in a slot when the transmission would overlap in time with a PRACH transmission to the target MCG or when a gap between a first or last symbol of a PRACH transmission to the target MCG in a first slot would be separated by less than N symbols from a last or first symbol, respectively, of the PUSCH/PUCCH/SRS transmission to the source MCG in a second slot. N=2 for µ=0 or µ=1, N=4 for µ=2 or µ=3, and µ is the SCS configuration of the active UL BWP for the PUSCH/PUCCH/SRS transmission to source MCG.

For a DAPS operation in a same frequency band, a UE does not transmit a PRACH to the source MCG in a slot when the transmission would overlap in time with a PUSC/PPUCCH/SRS transmission to the target MCG or when a gap between a first or last symbol of a PUSCH/PUCCH/SRS transmission to the target MCG in a first slot would be separated by less than N symbols from a last or first symbol, respectively, of the PRACH transmission to the source MCG in a second slot. N=2 for µ=0 or µ32 1, N=4 for µ=2 or µ=3, and µ is the SCS configuration of the active UL BWP for the PUSCH/PUCCH/SRS transmission to target MCG.

Figure 8:
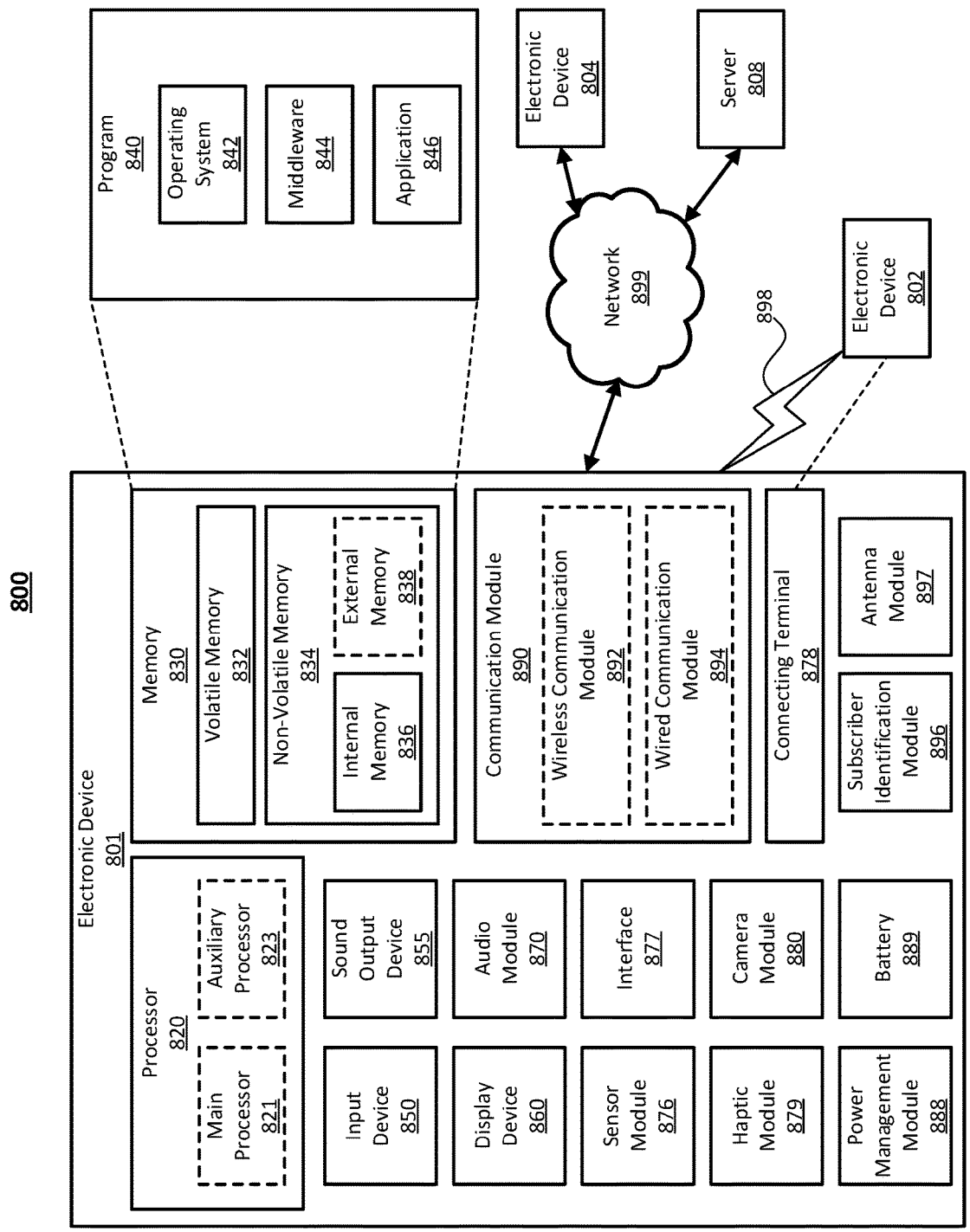
FIG. 8 illustrates a block diagram of an electronic device in a network environment, according to one embodiment.

FIG. 8 illustrates a block diagram of an electronic device 801 in a network environment 800, according to one embodiment. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). The electronic device 801 may communicate with the electronic device 804 via the server 808. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In one embodiment, at least one (e.g., the display device 860 or the camera module 880) of the components may be omitted from the electronic device 801, or one or more other components may be added to the electronic device 801. In one embodiment, some of the components may be implemented as a single integrated circuit (IC). For example, the sensor module 876 (e.g., a fingerprint sensor, an iris sensor, or an illuminance sensor) may be embedded in the display device 860 (e.g., a display).

The processor 820 may execute, for example, software (e.g., a program 840) to control at least one other component (e.g., a hardware or a software component) of the electronic device 801 coupled with the processor 820, and may perform various data processing or computations. As at least part of the data processing or computations, the processor 820 may load a command or data received from another component (e.g., the sensor module 876 or the communication module 890) in volatile memory 832, process the command or the data stored in the volatile memory 832, and store resulting data in non-volatile memory 834. The processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may he adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to one embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 860 may visually provide information to the outside (e.g., a user) of the electronic device 801. The display device 860 may include, for example, a display, a. hologram device, or a projector and control circuitry to control a corresponding one of the display, hologram device, and projector, According to one embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to one embodiment, the audio module 870 may obtain the sound via the input device 850, or output the sound via the sound output device 855 or a headphone of an external electronic device 802 directly (e.g., wired) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. The sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device 802 directly (e.g., wired) or wirelessly. According to one embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device 802. According to one embodiment, the connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. According to one embodiment, the haptic module 879 may include, for example, a motor, a piezoelectric element, or an electrical stimulator.

The camera module 880 may capture a still image or moving images. According to one embodiment, the camera module 880 may include one or more lenses, image sensors, image signal processors, or flashes.

The power management module 888 may manage power supplied to the electronic device 801. The power management module 888 may he implemented as at least part of, for example, a power management integrated circuit (PMIC).

The battery 889 may supply power to at least one component of the electronic device 801. According to one embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the AP) and supports a direct (e.g., wired) communication or a wireless communication. According to one embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or a standard of the Infrared Data Association (IrDA)) or the second network 899 (e.g., a long-range communication network, such as a cellular network, the :Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to one embodiment, the antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. All or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

One embodiment may be implemented as software (e.g., the program 840) including one or more instructions that are stored in a storage medium (e.g., internal memory 836 or external memory 838) that is readable by a machine (e.g., the electronic device 801). For example, a processor of the electronic device 801 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a compiler or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
receiving a scheduling of an uplink (UL) signal on a target cell that collides with a UL signal on a source cell;
determining a cancellation time for dropping the UL signal on the source cell as a time duration from an ending symbol of a physical downlink control channel (PDCCH) scheduling the UL signal on the target cell;
determining a time gap between the ending symbol of the PDCCH scheduling the UL signal on the target cell and the first symbol of the UL signal on the source cell; and
dropping at least a portion of the UL signal on the source cell in response to the determined time gap being greater than the determined cancellation time.

2. The method of claim 1, wherein the cancellation time is determined based on two numerologies.

3. The method of claim 1, wherein dropping at least a portion of the UL signal on the source cell comprises dropping a portion of the UL signal on the source cell that occurs after the determined cancellation time.

4. The method of claim 1, wherein dropping at least a portion of the UL signal of the source cell further comprises dropping all of the UL signal of the source cell when the UL signal on the source cell starts after the determined cancellation time.

5. The method of claim 1, further comprising determining a physical uplink shared channel (PUSCH) preparation time based on a PUSCH processing capability and a time duration corresponding to a subcarrier spacing (SCS) configuration.

6. The method of claim 5, wherein dropping at least a portion of the UL signal on the source cell comprises dropping a portion of the UL signal on the source cell that occurs after the determined PUSCH preparation time and the determined time duration.

7. The method of claim 6, wherein the SCS configuration corresponds to the smallest SCS configuration between an SCS configuration of a PDCCH carrying the scheduling of the UL signal on the target cell and the SCS configuration of the UL signal on the source cell.

8. The method of claim 1, further comprising determining a first time duration of symbols corresponding to a physical downlink shared channel (PDSCH) processing time for a user equipment (UE) processing capability and a second time duration of symbols corresponding to a physical uplink shared channel (PUSCH) preparation time for the UE processing capability.

9. The method of claim 8, wherein dropping at least a portion of the UL signal on the source cell comprises dropping a portion of the UL signal on the source cell that occurs after the first time duration and after the second time duration.

10. The method of claim 8, wherein the first time duration and the second time duration correspond to the smaller of a subcarrier spacing (SCS) configuration for a PDSCH on the target cell and an SCS configuration for the UL signal on the source cell.

11. The method of claim 1, further comprising determining a time gap between the UL signal on the source cell and a physical downlink shared channel (PDSCH) conveying a random access channel (RACH) response (RAR) message,
wherein dropping the portion of the UL signal on the source cell is performed when the time gap is greater than the cancellation time.

12. The method of claim 11, wherein the time gap is determined as a duration between a last symbol of the PDSCH conveying the RAR message to the first symbol of the UL signal of the source cell.

13. A user equipment (UE), comprising:
a transceiver; and
a processor configured to:
receive, by the transceiver, a scheduling of an uplink (UL) signal on a target cell that collides with a UL signal on a source cell;
determine a cancellation time for dropping the UL signal on the source cell as a time duration from an ending symbol of a physical downlink control channel (PDCCH) scheduling the UL signal on the target cell;
determine a time gap between the ending symbol of the PDCCH scheduling the UL signal on the target cell and a first symbol of the UL signal on the source cell; and drop at least a portion of the UL signal on the source cell in response to the determined time gap being greater than the determined cancellation time.

14. The UE of claim 13, wherein the cancellation time is determined based on two numerologies.

15. The UE of claim 13, wherein the processor is configured to drop at least a portion of the UL signal on the source cell by dropping a portion of the UL signal on the source cell that occurs after the determined cancellation time.

16. The UE of claim 13, wherein the processor is configured to drop at least a portion of the UL signal of the source cell by dropping all of the UL signal of the source cell when the UL signal on the source cell starts after the determined cancellation time.

17. The UE of claim 13, wherein the processor is further configured to determine a physical uplink shared channel (PUSCH) preparation time based on a PUSCH processing capability and a time duration corresponding to a subcarrier spacing (SCS) configuration.

18. The UE of claim 17, wherein the processor is configured to drop at least a portion of the UL signal on the source cell by dropping a portion of the UL signal on the source cell that occurs after the determined PUSCH preparation time and the determined time duration.

19. The UE of claim 18, wherein the SCS configuration corresponds to the smallest SCS configuration between an SCS configuration of a PDCCH carrying the scheduling of the UL signal on the target cell and the SCS configuration of the UL signal on the source cell.

20. The UE of claim 13, wherein the processor is further configured to determine a first time duration of symbols corresponding to a physical downlink shared channel (PDSCH) processing time for a user equipment (UE) processing capability and a second time duration of symbols corresponding to a physical uplink shared channel (PUSCH) preparation time for the UE processing capability.

21. The UE of claim 20, wherein the processor is configured to drop at least a portion of the UL signal on the source cell by dropping a portion of the UL signal on the source cell that occurs after the first time duration and after the second time duration.

22. The UE of claim 20, wherein the first time duration and the second time duration correspond to the smaller of a subcarrier spacing (SCS) configuration for a PDSCH on the target cell and an SCS configuration for the UL signal on the source cell.

23. The UE of claim 13, wherein the processor is further configured to determine a time gap between the UL signal on the source cell and a physical downlink shared channel (PDSCH) conveying a random access channel (RACH) response (RAR) message,
wherein the processor is configured to drop the portion of the UL signal on the source cell when the time gap is greater than the cancellation time.

24. The UE of claim 23, wherein the time gap is determined as a duration between a last symbol of the PDSCH conveying the RAR message to a-the first symbol of the UL signal of the source cell.

* * * * *